UNITED STATES PATENT OFFICE.

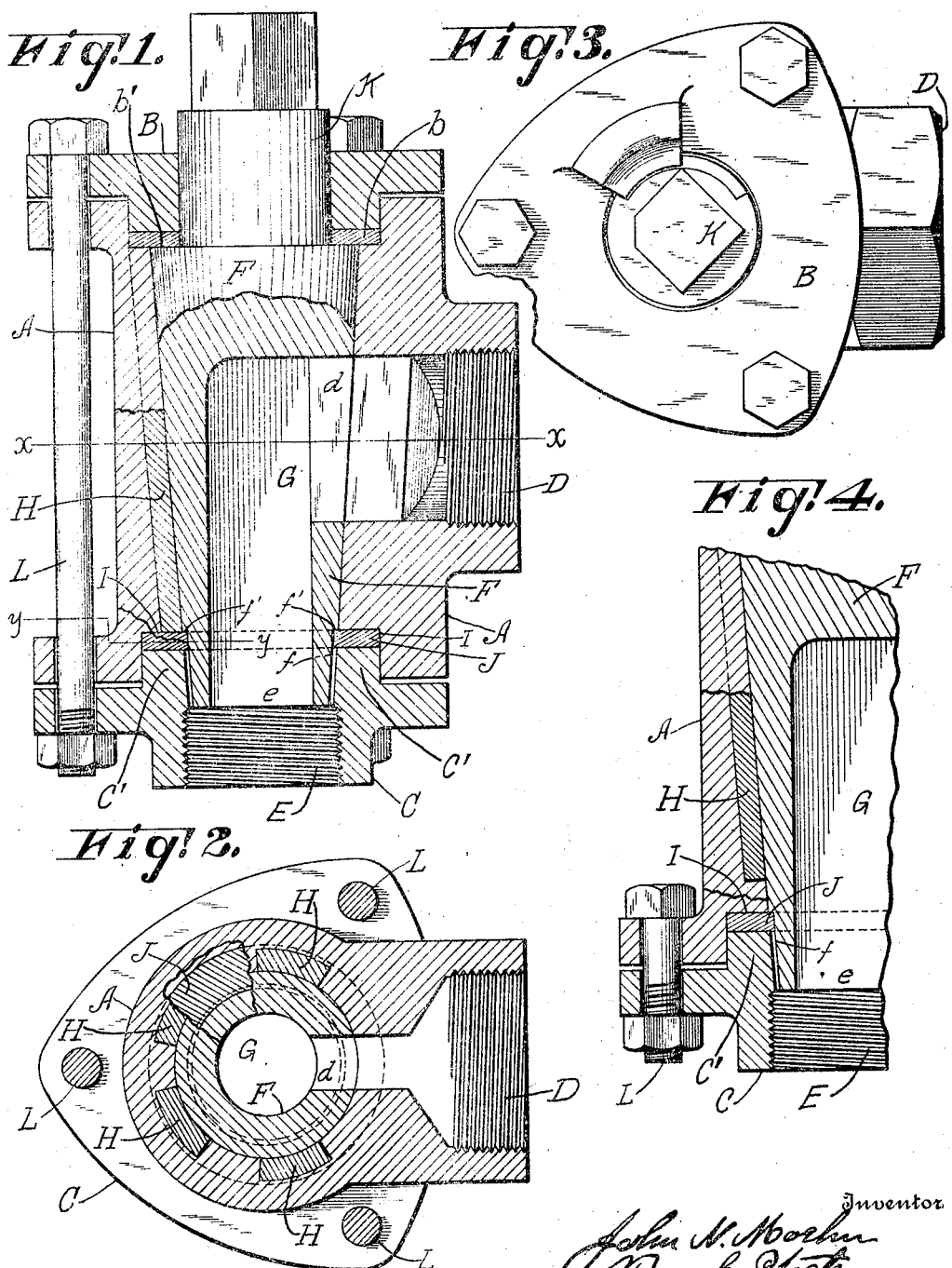

JOHN N. MOEHN, FRANK STOCK, AND OSCAR H. STUEWE, OF MILWAUKEE, WISCONSIN.

TAPERED-PLUG VALVE.

1,187,165.  Specification of Letters Patent.  Patented June 13, 1916.

Application filed June 26, 1915. Serial No. 36,447.

*To all whom it may concern:*

Be it known that we, JOHN N. MOEHN, FRANK STOCK, and OSCAR H. STUEWE, citizens of the United States, residing at Milwaukee, county of Milwaukee, and State of Wisconsin, have invented new and useful Improvements in Tapered-Plug Valves, of which the following is a specification.

Our invention relates to improvements in tapered plug valves.

The object of our invention is to provide a valve of the described class, which will more effectively prevent leakage of air, steam or other fluid than valves of this type heretofore constructed.

Our improved valve is peculiarly adapted for use as a blow out valve for a boiler, although it may be utilized in any relation where tapered plug valves are employed.

In the drawings—Figure 1 is a vertical sectional view of a tapered plug valve embodying our invention, drawn to a plane cutting the axis of the inlet, and partially broken away to a plane cutting one of the packing strips. Fig. 2 is a horizontal sectional view, drawn on line x—x of Fig. 1 and partially broken away to a plane on the line y—y of Fig. 1. Fig. 3 is a plan view. Fig. 4 is a fragmentary view, in vertical section, showing a slightly modified form of construction.

Like parts are identified by the same reference characters throughout the several views.

A valve casing A has a tapered bore extending through it and is provided with end caps B and C at the top and bottom respectively. The casing is provided with an inlet port D in one side thereof, and an outlet port E at the bottom. A conically tapered plug valve F is seated in said tapered bore and is provided with an elbowed passage or port G, the inlet d of which is adapted to register with the casing inlet port D. The outlet e is in constant registry with the casing outlet port E in all positions of valve adjustment.

The interior surface of the wall of the casing A is provided with a set of downwardly extending channels, which receive packing members H. At the lower end of the casing cavity the bore is enlarged annularly to form a recess I in the interior surface of the casing wall, which is adapted to receive a suitable packing ring J. The valve F is provided with a corresponding annular recess f in its outer surface at its smaller end, this recess terminating in the shoulder f' which is in substantial registry with the upper wall of the annular channel I. The outlet port E is of sufficient size to permit the lower end of the tapered plug valve F to project into it, whereby the valve plug may be moved downwardly from time to time to take up wear. The port G, including the inlet d and the outlet e, is of such size as to allow a free flow of fluid from the port D.

It will be observed that the packing strips H are symmetrically disposed in the wall of the casing A. The packing strips flank each side of the inlet port D and effectually prevent fluid under pressure from following the surface of the valve from port D to the port d when the valve has been rotated to carry port d into registry with or across one of said packing strips H. Fluid is also prevented from following the surface of the valve downwardly to the outlet port between the packing strips H by the annular packing ring J.

The valve is provided with an operating stem K of ordinary construction, which projects through an aperture in the cap B. The cap B will of course be suitably packed around the stem near the top of the casing where packing of varying thickness may be employed in case it is desired to adjust the valve F downwardly to take up wear. The packing ring b rests upon the top of the valve and also upon the shoulder b' formed by recessing the interior wall of the casing at its upper end. The cap B carries a downwardly projecting annulus which seats upon this packing ring. The coupling member or bottom cap C may be secured to the lower end of the casing. It is provided with an upwardly projecting annulus C' which bears upon the packing ring J. Both caps may be secured in position by a plurality of clamping bolts L. When the clamping bolts L are tightened, the packing rings J and b compress them upon the valve and casing shoulders and also tends to spread these rings against the inner and outer walls of the packing cavity, i. e. the outer wall of the valve (or its stem) and the inner wall of the casing. We therefore have provided an adjustable packing which may be additionally compressed from time to time to take up wear, and which may be maintained under pressure against the walls of the cavities not only at the top and bottom, but at the inner and outer sides also.

We are aware that packing rings have been provided near the lower ends of tapered plug valves, but we believe we are the first to provide means for applying an adjustable clamping pressure thereto and for also providing a structure in which the packing bears against the valve both laterally and vertically, and particularly in which such bearing is secured under pressure. We also believe we are the first to provide means whereby packing rings may be clamped against such a valve at both ends thereof.

We claim—

1. The combination with a valve casing having a tapered bore extending therethrough and a side inlet port communicating with said bore, of a tapered plug valve seated in said bore and provided with a port adapted at one end for registry with the inlet port, and at the other end leading through the smaller end of the valve, the opposing surfaces of the valve and casing being annularly recessed at said end to provide a packing cavity open to the exterior at the end of the valve and casing, a cap covering said end of the casing and having an outlet port therein encircled by an annulus projecting into said cavity, and an apertured packing interposed between said annulus and the walls of the cavity with the smaller end of the valve projecting through it into the outlet port, substantially as described.

2. The combination with a tapered plug valve having an elbowed passage extending inwardly from one side of the valve and outwardly through the smaller end thereof, said end of the valve having its exterior wall recessed and adapted to coöperate with a casing to form a packing receiving cavity, a casing in which said valve is seated, provided with an inlet port with which the inlet end of the valve port may register and having an opening through which the smaller end of the valve projects, a cap having an outlet port adapted to receive the projecting end of the valve, and provided with an annulus extending into said cavity, and adapted to clamp a packing therein between the cap and casing wall, and means for adjustably securing said cap to the casing, substantially as described.

3. The combination with a valve casing, of a tapered plug valve seated therein, and having an elbowed port leading through one side and the smaller end of the valve, the opposing walls of said valve and casing being arranged to form an annular packing receiving cavity at the smaller end of the valve, an annular packing seated in said cavity, an adjustable annulus seated in said cavity, and means connected with the casing, for clamping said packing against the casing wall of said cavity in frictional contact with the valve.

4. The combination with a valve casing having a tapered bore extending therethrough, a tapered plug valve seated therein, said casing having a lateral inlet port and said valve having a passage adapted at one end for registry with said port when the valve is in one position of rotative adjustment, said valve passage extending through the smaller end of the valve and said valve and casing being formed to provide open annular recesses at their respective ends to receive a packing, and a set of clamping caps adjustably secured to the casing and each adapted to compress the packing between it and the base of one of said recesses, portions of said valve extending through both of the packing receiving recesses, whereby said packings may be forced inwardly into frictional contact with the sides of said portions of the valve by compression exerted by the clamping caps.

5. The combination with a casing having a tapered bore extending therethrough, of a tapered plug valve adapted to fit said bore and having an elbowed port extending from one of its side walls through its smaller end, said bore being enlarged near the smaller end of the valve to provide an annular recess open at the outlet end of the casing, a clamping member adjustably connected with the casing and provided with an annulus adapted to enter said recess, and a packing in said recess adapted to be clamped by said annulus against the base of the recess.

In testimony whereof we have affixed our signatures in the presence of two witnesses.

JOHN N. MOEHN.
FRANK STOCK.
OSCAR H. STUEWE.

Witnesses:
LEVERETT C. WHEELER,
IRMA D. BREMER.